(12) United States Patent
Eichhorn et al.

(10) Patent No.: US 6,585,239 B2
(45) Date of Patent: Jul. 1, 2003

(54) COMPENSATION OF TRANSVERSE FORCES IN PNEUMATIC SPRING STRUTS

(75) Inventors: Martin Eichhorn, Sennfeld (DE); Bruno Deigner, Niederwerrn (DE)

(73) Assignee: Mannesmann Sachs AG, Schweinfurt (DE)

(*) Notice: Subject to any disclaimer, the term of this patent is extended or adjusted under 35 U.S.C. 154(b) by 28 days.

(21) Appl. No.: 09/854,783

(22) Filed: May 14, 2001

(65) Prior Publication Data
US 2002/0003326 A1 Jan. 10, 2002

(30) Foreign Application Priority Data
May 19, 2000 (DE) .......................... 100 24 983

(51) Int. Cl.[7] .................. B60G 15/12; B60G 11/27; B60G 17/00; B60G 9/14; B60G 9/05; F16F 9/14; F16F 9/05

(52) U.S. Cl. .............. 267/64.24; 267/122; 267/64.27; 267/35

(58) Field of Search .............. 267/64.24, 64.27, 267/122, 64.21, 64.11, 35, 219, 220, 64.23; 280/124.162, 124.158, 124.154, 124.145, 124.146, 124.147, DIG. 1, 124.157, 124.155

(56) References Cited

U.S. PATENT DOCUMENTS
4,988,082 A * 1/1991 Pees
5,918,863 A * 7/1999 Crabtree et al.

FOREIGN PATENT DOCUMENTS
DE  2 063 448   7/1972
DE  2 100 338   8/1972
DE  40 10 982  10/1990

* cited by examiner

Primary Examiner—Douglas C. Butler
(74) Attorney, Agent, or Firm—Cohen, Pontani, Lieberman & Pavane

(57) ABSTRACT

A spring strut comprises a pneumatic spring and an oscillation damper and is fitted between a vehicle body and a wheel of a vehicle. The oscillation damper has a piston rod movable on an axis and a container concentric to the axis. The pneumatic spring has a spring chamber delimited by a rolling bellows which is firmly connected to the receptacle and to the container or a rolling-contact piston fixed to the container. An end wall that is in operative connection with the oscillation damper is acted upon on one side by the pressure in the spring chamber and has an effective area that extends obliquely to the axis of the oscillation damper and exerts a transverse force that is dependent on the pressure in the spring chamber and is perpendicular to the axis.

9 Claims, 2 Drawing Sheets

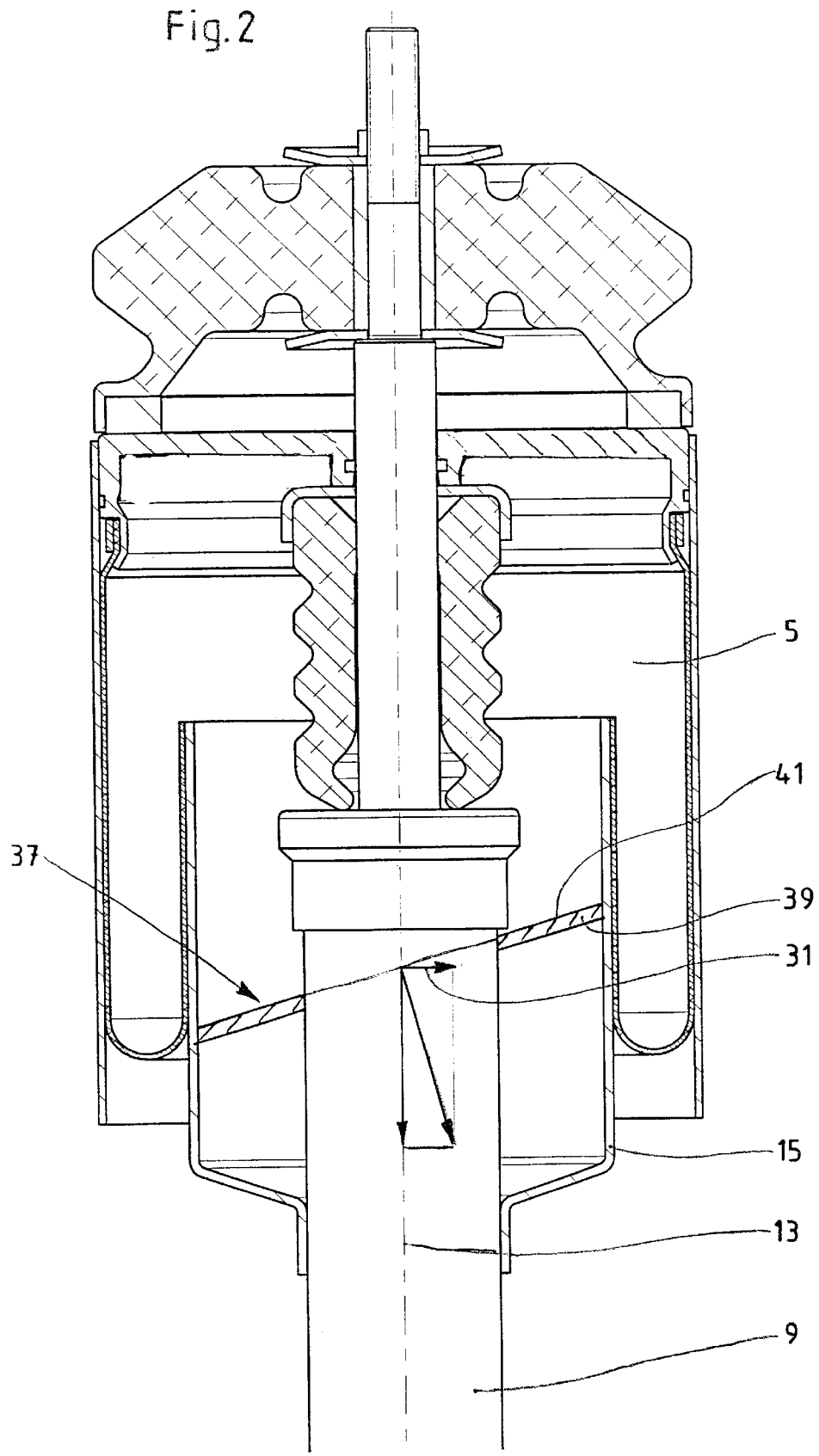

COMPENSATION OF TRANSVERSE FORCES IN PNEUMATIC SPRING STRUTS

BACKGROUND OF THE INVENTION

1. Field of the Invention

The invention relates to a spring strut, which comprises a pneumatic spring and an oscillation damper and is fitted between a vehicle body and a vehicle wheel. The pneumatic spring has a spring chamber delimited by a rolling bellows which is connected to a receptacle and to a container or to a rolling contact piston fixed to a container.

2. Description of the Related Art

Wheel-guiding forces are exerted on the spring strut by steered wheels via an axle stub, for example. The forces perpendicular to the axis of the oscillation damper, in particular, are problematic since these produce bending moments on the oscillation damper and hence on the piston rod, the end of which is connected in a moveable manner to the vehicle body. The bowing of the piston rod can lead to jamming in the piston-rod guide, resulting not only in high frictional and clamping forces but also high transverse bearing forces on the fixing point of the piston rod on the vehicle body.

To reduce the bending forces acting on the piston rod and hence to reduce the transverse bearing forces on the fixing point of the piston rod on the vehicle body in the case of spring struts with pneumatic springing, DE-A 2 063 448 and DE-A 2 100 338 disclose arranging the axis of the pneumatic spring obliquely to the axis of the oscillation damper. The disadvantage is the asymmetric deformation of the rolling bellows of the pneumatic spring that occurs in the case of obliquely positioned pneumatic springs, leading to wear and hence to a shorter life for the rolling bellows. One possibility for reducing the deformation work of the rolling bellows, a possibility that is associated with a high outlay in terms of production and assembly and is therefore very expensive, is indicated in DE-A 2 100 338, the container of the oscillation damper being connected to a three-dimensionally curved rolling-contact body that is complicated to produce.

SUMMARY OF THE INVENTION

It is the object of the present invention to create a spring strut that is provided with a pneumatic spring and can be produced economically, which, while being of simple construction, effects a reduction or compensation of the transverse bearing forces caused by the wheel-guiding forces and hence also of the bending forces acting on the piston rod and, at the same time, exhibits as little as possible stress on the rolling bellows.

According to the invention, this object is achieved with the distinguishing features of claim 1. Advantageous refinements and further embodiments are the subject matter of the subclaims.

According to the invention, a spring strut that is of simple construction and can be produced economically is created by providing a body that is acted upon on one side by the pressure in the spring chamber and is in operative connection with the oscillation damper. This body has an effective area that extends obliquely to the axis of the oscillation damper and exerts a transverse force that is dependent on the pressure in the spring chamber and is perpendicular to the axis, thereby ensuring in a simple manner a reduction or compensation of the forces exerted by the wheel-guiding forces. The transverse force that can be achieved is dependent on the pressure in the spring chamber, and the obliquity and effective size of the effective area, allowing adaptation to the required reduction in the forces occurring at the fixing point of the piston rod in the vehicle body by changing the obliquity of the effective area.

Minimization of the stress on the rolling bellows is achieved if, according to a further feature of the invention, the axis of the pneumatic spring coincides with the axis of the oscillation damper. Over the entire spring travel, the rolling bellows moves without asymmetric deformation in an annular space which is delimited, on the one hand, by the rolling-contact piston and, on the other hand, by a protective tube, the axis of the protective tube lying on the axis of the rolling-contact tube. The rolling bellows has a simple shape since it is secured on a cylindrical portion of the body and this body is arranged in a sealing and axially displaceable manner on the piston rod and has an effective area formed by the end of the body and extending obliquely to the axis.

A simple overall structure of the spring strut is obtained if the end of the body has an outer extension and hence acts on a flexible mounting component arranged on the end of the piston rod. It is also advantageous if the body forms a contact surface for a flexible compression stop of the oscillation damper.

To ensure that the rolling bellows, which is secured by one end on the rolling-contact piston connected to the container of the oscillation damper and by the other end on the cylindrical portion of the body, is not subjected to torsion, the outer extension of the body has a supporting surface that extends perpendicular to the axis of the oscillation damper and is arranged so as to interact with a corresponding mating surface of the mounting component. For particular ease of motion, a pivot bearing is arranged between the supporting surface of the outer extension and the mating surface of the mounting component, this pivot bearing advantageously being designed as a rolling-contact bearing.

In another embodiment, the body that has the effective area extending obliquely to the axis is fitted between the outer wall of the container and the inner wall of the rolling-contact piston and sealed off from the outside. The force exerted on the body by the pressure in the spring chamber acts on the container and counteracts the effective wheel-guiding forces in accordance with the position of installation of the body. There are different ways of producing this effective area extending obliquely to the axis and securing it in such a way as to form a seal with respect to the outside. For example, the rolling-contact piston can be designed in such a way that it has this effective area, i.e. is in one piece with this effective area.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 2 shows an embodiment of the spring strut with an effective area that is in operative connection with the container of the oscillation damper.

DETAILED DESCRIPTION OF THE PRESENTLY PREFERRED EMBODIMENTS

Figure 1:
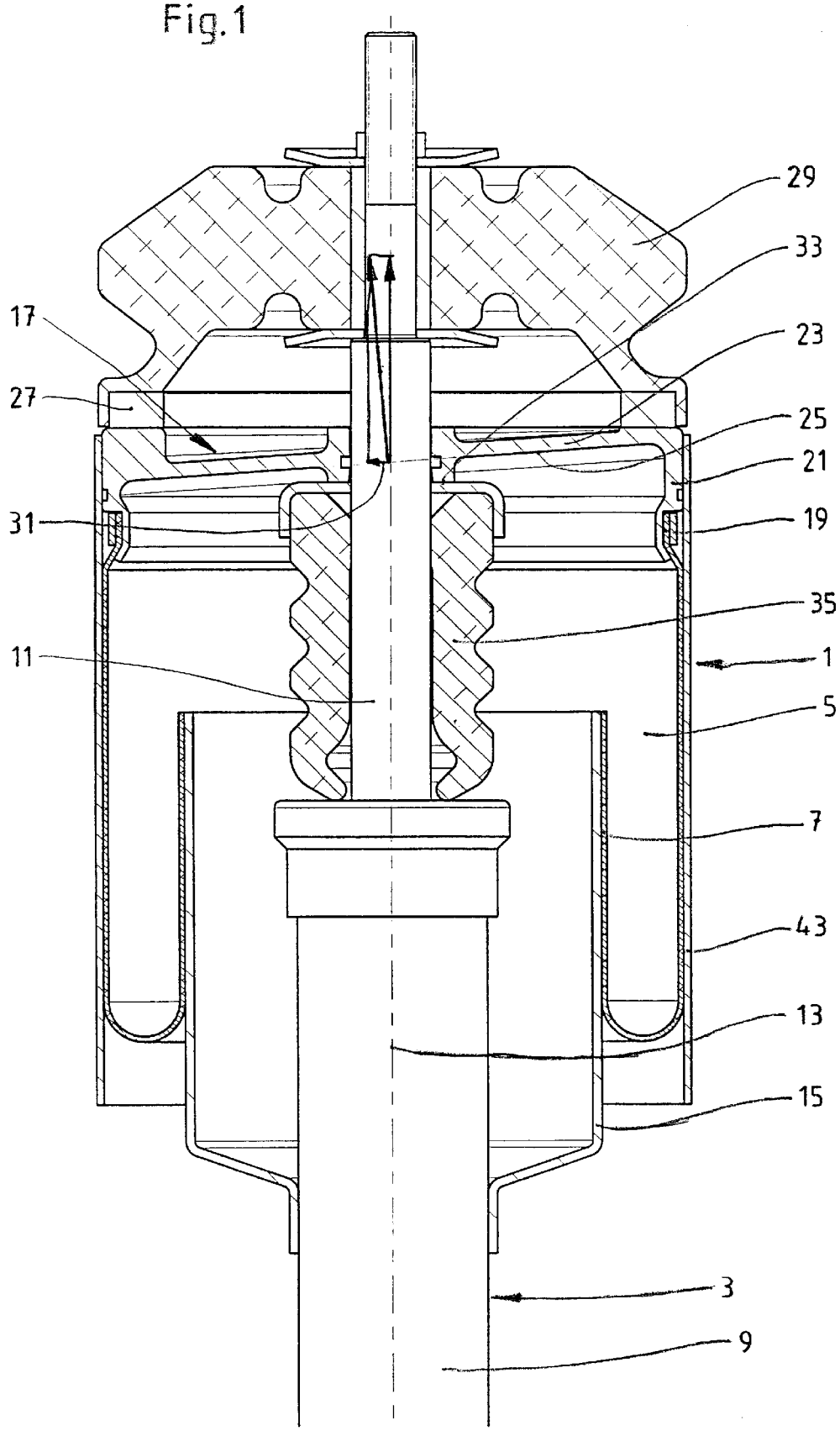
FIG. 1 shows a spring strut with a pneumatic spring in longitudinal section.

The spring strut in FIG. 1 comprises a pneumatic spring 1 and an oscillation damper 3, is fitted between running gear (not shown) and a vehicle body (likewise not shown), and is acted upon by wheel-guiding forces. A spring chamber 5 filled with a gaseous filling medium and subjected to a pressure corresponding to the proportion of the weight of the vehicle body to be borne is delimited with respect to the outside by a rolling bellows 7, the rolling bellows 7 being situated in a protective tube 43 and being secured in a sealing manner on a body 17, on the one hand, and on a rolling-contact piston 15, on the other hand. The symmetrically constructed pneumatic spring 1 has a longitudinal axis that coincides with the axis 13 of the oscillation damper 3. The rolling-contact piston 15, which forms a component chamber of the pneumatic spring 1, is secured on a container 9 of the oscillation damper 3. The body 17 is arranged in an axially movable manner on the piston rod 11 of the oscillation damper 3 and is sealed relative to the rod. The body 17 has an end wall 23 in a plane extending obliquely (here about five degrees from perpendicular) to the axis 13 and has a cylindrical portion 21, on which the end 19 of the rolling bellows is secured. The body 17 has a peripheral axial extension 27 which is supported on a mounting component 29 at the end of piston rod 11. A flexible compression stop 35 bears against a contact surface 33 of the body 17 to urge the body 17 against the mounting component 29. The extension 27 forms a supporting surface that extends perpendicular to the axis 13 and acts on a corresponding mating surface of the mounting component 29. A pivot bearing, which is advantageously embodied as a rolling-contact bearing, is provided between the supporting surface of the outer extension 27 and the mating surface of the mounting component 29 to allow body 17 to rotate more easily relative to the mounting component 29.

With the vehicle body, the piston rod 11 of the spring strut forms a pin joint at which the wheel-guiding forces acting on the spring strut, in particular those forces that act transversely to the axis 13 and give rise to bending stress on the piston rod 11 and the container are supported. These forces transmitted from the wheel to the spring strut can be very large, making it necessary to compensate for these forces to ensure that satisfactory axial motion of the spring strut is assured and that the piston rod 11 does not jam in the guide. To achieve this, a transverse force 31 counter to the bending stress is exerted on the pin joint via the piston rod 11. To achieve this, use is made of the end wall 23 extending obliquely to the axis 13, the effective area 25 of which exerts a resultant force depending on the pressure in the spring chamber 5 owing to its obliquity, this force having a transverse-force component and hence exerting a relieving effect on the mounting location in the vehicle body via the piston rod 11, i.e. counteracting the wheel-guiding forces. The longitudinal-force component caused by the pressure in the spring chamber 5 acting on the end wall 23 is transmitted via the outer extension 27 of the body 17 to the mounting component 29 supported on the vehicle body. Ease of rotation of the body 17 relative to the mounting component 29 is achieved by means of a rolling-contact bearing acting between the supporting surface of the outer extension 27 and the mating surface of the mounting component 29. Torsional stress on the rolling bellows 7 is thus avoided, especially in the case of spring struts for steered wheels. It is important that the body 17 should be sealed off and axially displaceable relative to the piston rod 11 to allow rotation and axial displacement for separate force transmission. The axially acting stop force of the flexible compression stop 35 acting on the contact surface 33 of the body 17 is also transmitted directly to the mounting component 29 by virtue of axial mobility of the body 17 on the piston rod 11.

The variant embodiment shown in FIG. 2 differs from that in FIG. 1 essentially in that the wall 37 in a plane arranged obliquely (here about fifteen degrees from perpendicular) to the axis 13 is a disk 39 fitted between the outer wall of the container 9 and the inner wall of the rolling-contact piston 15. The pressure exerted on the effective area 41 by the gas in the spring chamber 5 results in a transverse force 31 that acts on the container 9 in such a way that it counteracts the transverse forces due to the wheel-guiding forces and thus relieves the fixing point of the spring strut on the vehicle body.

The important point in both embodiments is that the axis of the pneumatic spring 1 corresponds to the axis 13 of the oscillation damper 3, with the result that there is no asymmetric deformation of the rolling bellows 7 during the compression and rebound movement but a transverse-force component that counteracts the wheel-guiding forces is nevertheless created by the pneumatic spring 1. The magnitude of the transverse force component is dependent on the size of the effective area extending obliquely to the axis, the angle of the area to the axis, and the pressure. For a given pressure, a larger oblique surface area requires less obliquity to achieve the same transverse force.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A spring strut comprising
   an oscillation damper having an axis, a piston rod movable on said axis, and a container concentric to said axis, and
   a pneumatic spring having a central axis which coincides with the axis of the oscillation damper, said pneumatic spring comprising a receptacle arranged sealingly on said piston rod, a rolling bellows fixed between said receptacle and said container, and a spring chamber delimited by said rolling bellows and an end wall which is operatively connected to said oscillation damper and has an effective area which is oblique to said axis, whereby the pressure exerted on the effective area by a gas in said spring chamber results in a force component which is transverse to said axis.

2. A spring strut as in claim 1 wherein said end wall is formed by said receptacle, said receptacle comprising a cylindrical portion surrounding said end wall, said rolling bellows being secured to said cylindrical portion.

3. A spring strut as in claim 2 wherein said end wall is arranged in a sealing and axially movable manner on said piston rod.

4. A spring strut as in claim 2 further comprising a flexible mounting component arranged on an end of the piston rod, said receptacle having a peripheral axial extension which is supported against said flexible mounting component.

5. A spring strut as in claim 4 wherein said peripheral axial extension has a supporting surface in a plane perpendicular to said axis, said supporting surface bearing against a mating surface of said flexible mounting component.

6. A spring strut as in claim 5 further comprising a pivot bearing arranged between the supporting surface and the mating surface.

7. A spring strut as in claim 6 wherein said pivot bearing is a rolling contact bearing.

8. A spring strut as in claim 1 further comprising a flexible compression stop arranged between the container and the receptacle.

9. A spring strut as in claim 1 further comprising a rolling contact piston fixed concentrically to said container, said end wall being fixed between said rolling contact piston and said container.

* * * * *